(12) United States Patent
Randolph

(10) Patent No.: US 7,415,900 B1
(45) Date of Patent: *Aug. 26, 2008

(54) BLAST PRESSURE GAUGE

(75) Inventor: Rex N. Randolph, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 53 days.

This patent is subject to a terminal disclaimer.

(21) Appl. No.: 11/703,905

(22) Filed: Jan. 31, 2007

Related U.S. Application Data

(62) Division of application No. 11/122,208, filed on Apr. 29, 2005, now Pat. No. 7,261,006.

(51) Int. Cl.
*G01L 1/04* (2006.01)

(52) U.S. Cl. .............................. 73/862.637; 73/81; 73/82
(58) Field of Classification Search ................................
73/862.634–862.639, 744–746, 774–775,
73/756, 81–82, 85
See application file for complete search history.

(56) References Cited

U.S. PATENT DOCUMENTS

| 6,925,887 | B1 * | 8/2005 | Coffey et al. ................. 73/774 |
| 7,162,919 | B1 * | 1/2007 | Randolph ...................... 73/161 |

* cited by examiner

*Primary Examiner*—Helen C. Kwok
(74) *Attorney, Agent, or Firm*—Brian F. Drazich

(57) ABSTRACT

Blast pressure gauges and methods for detecting blast pressure during a blast test. The gauges operate independently of power sources, are portable, and are used in harsh environments including test ranges. Each embodiment is constructed to detect blast pressures as required in the circumstances of a particular blast test.

15 Claims, 3 Drawing Sheets

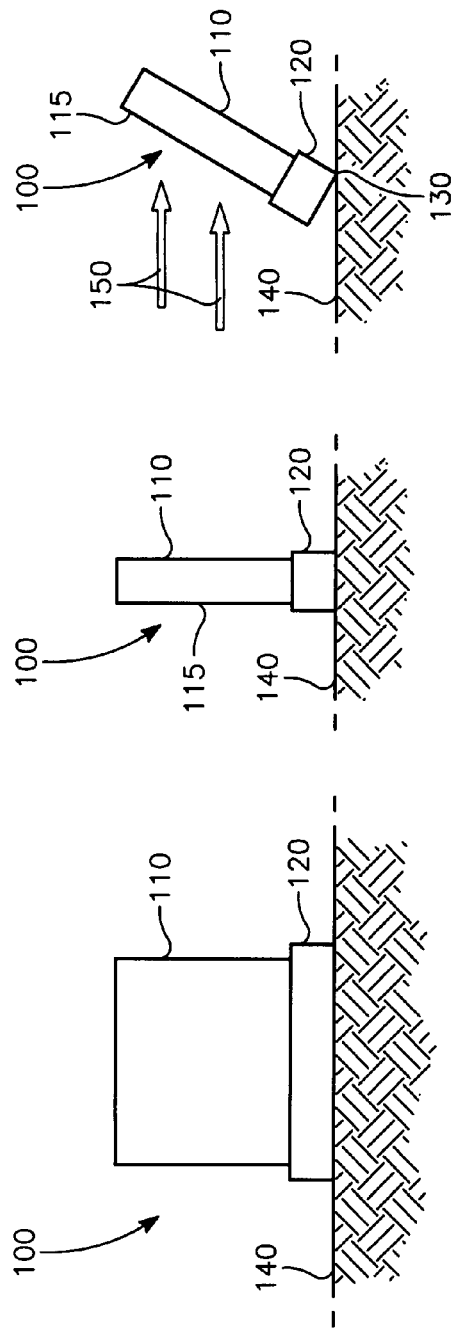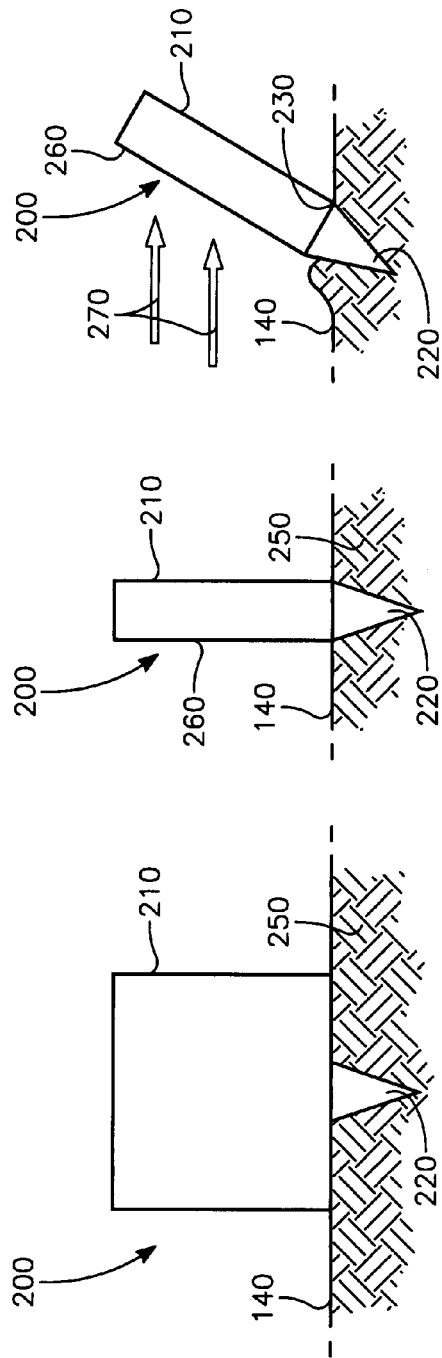

BLAST PRESSURE GAUGE

CROSS-REFERENCE TO RELATED APPLICATIONS

This is a divisional of application Ser. No. 11/122,208, filed Apr. 29, 2005, now U.S. Pat. No. 7,261,006.

This application is co-pending and was concurrently filed with U.S. patent application Ser. No. 11/122,207.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

When testing explosives or warheads it is necessary to collect data regarding the characteristics of the resultant blast. In particular, blast pressure data are needed to determine the magnitude of the blast and the blast range for a warhead. For example, blast pressure data are needed to determine whether a warhead meets its operational lethality requirements. In addition, blast pressure data are needed to ensure accurate calculations of warhead/delivery vehicle safe separation requirements.

The detonation area around a warhead explosion is a very destructive environment. The environment is so harsh that weapon tests must be conducted at long distances from populated areas. The instruments used to measure explosion data are likely to be destroyed. Blast pressure gauges known in the art require electrical power and must be connected to a recording device via an electronic circuit. These gauges, with their electrical wiring and data transmission lines, are time consuming to set up. In addition, electrical power is not readily available in some test locations to operate the gauges and the recording devices. When the warhead is tested in an enclosed volume such as a room or a cave, reflected blast pressure can invalidate the data recorded. Therefore, there is a need for blast pressure gauges that are easily transported, simple to set up, independent of power sources or data transmission lines, easy to read and inexpensive.

BRIEF DESCRIPTION OF THE DRAWINGS

FIGS. 1A-1C are front and side views of a gravity gauge according to an embodiment of the invention.

FIGS. 2A-2C are front and side views of a spike gauge according to another embodiment of the invention.

DETAILED DESCRIPTION OF THE INVENTION

Figure 3:
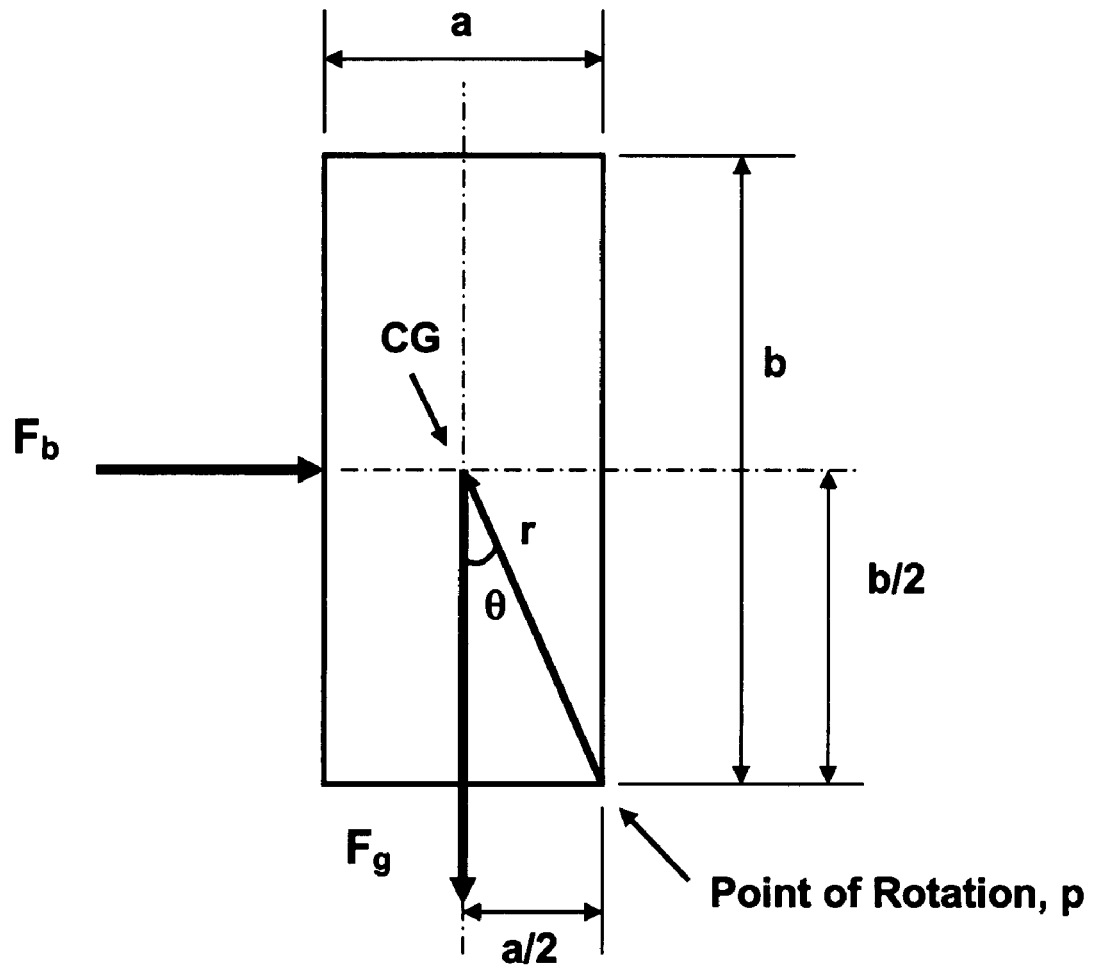
FIG. 3 is a diagram accompanying a calculation of threshold blast pressure of a gravity gauge according to an embodiment of the invention.

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation. In the figures, the same reference numbers are used to identify the same components.

Embodiments of the present invention include blast pressure gauges and methods for detecting a particular blast pressure during a blast test. The embodiments operate independently of power sources, are portable, and are used in harsh environments including test ranges. Each embodiment is constructed to detect a blast pressure as required in the circumstances of a particular blast test. The blast pressure gauges according to embodiments of the invention are placed at locations around a proposed weapon impact point at the test facility. When the weapon misses the intended impact point, it should still impact and detonate in an area where there are blast pressure gauges and the blast pressure shall be detected.

Gravity Gauge

FIGS. 1A-1C illustrate an embodiment of a gravity gauge 100. A gravity gauge includes a plate 110 has a face 115 and a base 120. An embodiment includes a plate 100 with an integral base 120 or foot constructed to have a very low center of gravity and consequently be difficult to push over by the blast pressure wave 150 emanating from the detonation of a high explosive charge. The weight of the gauge is dependent upon the blast pressure that is desired to be detected. Embodiments of the invention are constructed of a durable material such as, for example, concrete, metal, or a hollow structure filled with liquid or solids. The largest area of the plate perpendicularly presented to the blast pressure is the face 115. FIGS. 1A-1C illustrate one embodiment that is roughly rectangular in shape and of a thickness so as to provide the required weight for the desired blast pressure to be detected and to ensure the gauge would not bend when impacted by the blast wave. (see FIG. 1C) The base 120 contributes to the weight of the gauge and lowers the center of gravity. The specific size, shape, material, and weight of the plate 110 and base 120 is dependent upon the threshold blast pressure it is constructed to measure. For example, a large (12-inch by 12-inch) relatively thin (0.5-inch) gauge would have a lower blast pressure threshold while smaller, thicker gauges would have a relatively higher blast pressure threshold. The embodiments of the gravity gauge may have a weight of up to about 50 pounds and the face 115 have an area of up to about 4 square feet.

An embodiment of the gauge utilizes its inertia to resist the pressure of the blast wave. A plurality of gauges are placed on their bases on a surface 140 at a number of locations at random distances from the origin of the blast pressure and are placed so that their faces are perpendicular to the velocity vector of the blast pressure (see FIG. 1C). When the blast pressure impacts the face 115 of the gauge it applies a force over the area of the face 115 and base 120. This force per area is the blast pressure experienced by the gauge. Upon impact of the blast pressure, the gauge shall tip away from the origin of the blast pressure around an axis located at the bottom rear edge of the gauge 130. This tipping is resisted by the mass of the gauge and the acceleration of gravity (the weight of the gauge). The gauge's resistance to tipping and overturning is calculated by one of skill in the art, knowing the moment of inertia of the gauge and assuming that the force of the blast pressure is applied uniformly over the face of the gauge. The overturning resistance is equivalent to the threshold blast pressure required to overturn the gauge. Therefore, to detect a particular blast pressure, gauges with the desired threshold blast pressure are selected and placed in random locations around the origin of the blast pressure with the faces placed perpendicularly to the blast pressure. Upon impact by the threshold blast pressure the gauges will overturn, thereby detecting the blast pressure desired to be detected.

Sample Calculation of a Threshold Pressure

The force required to push a gauge over is calculated in the following manner. A gravity gauge with the face 115 and base 120 (see FIGS. 1A-1B) is constructed together as a unitary structure with a rectangular cross section with height b and thickness a. The force of gravity acting to keep the gauge upright is Fg and it acts downward through the center of gravity CG, as illustrated in FIG. 3. The blast pressure, Fb, acting to overturn the gauge is assumed to be concentrated on the CG. The gravity gauge, when impacted by the blast pressure, will rotate about its lowest edge contacting the surface 140 (see FIGS. 1A-1B) furthest from the origin of the blast pressure, p. The force of gravity acting to keep the gauge from rotating about p produces a torque equal to $Fg*r*\sin\theta$. This torque should be overcome for the gauge to be overturned. The torque produced by a blast pressure that should be effective enough to produce rotation is $Fb*r*\cos\theta$. Thus, rotation about p occurs when:

$$Fb*r*\cos\theta = Fg*r*\sin\theta$$

But, $r*\cos\theta = b/2$ and $r*\sin\theta = a/2$. Thus, $Fb*b/2 = Fg*a/2$, or $$Fb*b = Fg*a, \text{ or}$$

$$Fb = Fg*a/b$$

For example, when a gravity gauge weighs 20 pounds and a=2 inches and b=4 inches, then Fb=20 pounds*2/4=10 pounds. When the gauge face has an area of 24 square inches, the 10-pound force would result in a pressure of: 10 pounds/24 square inches=0.4167 psi. Therefore the gravity gauge will overturn at a threshold blast pressure of 0.4167 psi, thereby detecting that at least the threshold blast pressure exists at the location of the gravity gauge. By reversing these calculations a gravity gauge should be constructed so as to be calibrated to have a desired threshold blast pressure.

Spike Gauge

FIGS. 2A-2C illustrate one embodiment of a spike gauge 200. A plate 210 has an integral spike 220 constructed to be pushed into a surface 140, and into a material below the surface (such as but not limited to soil, gravel, rock, sand) 250. An embodiment includes a plate 210 with an integral spike 220 extending from and opposing the plate 210, constructed to be stiff and resistant to bending by a blast pressure wave emanating from the detonation of a high explosive charge. The weight of the gauge 200 and the size and shape of the spike 220 is dependent upon the blast pressure that is desired to be detected. Embodiments may be constructed of a durable material such as, for example, concrete, metal, or a hollow structure filled with liquid or solids. The largest area of the plate 210 is the face 260 that is perpendicularly presented to the blast pressure. FIGS. 2A-2C illustrate one embodiment that is roughly rectangular in shape and of a thickness so as to provide the required weight, stiffness and resistance to overturning required for the desired blast pressure to be detected and to ensure the gauge will not bend when impacted by the blast wave. For example, a large (12-inch by 12-inch) relatively thin (0.5-inch) gauge with a thin, short spike would have a low blast pressure threshold while smaller, thicker gauges with wide long spikes would have a relatively high blast pressure threshold. The embodiments of the spike gauge may have a weight of up to about 50 pounds and the face 260 have an area of up to about 1 square feet.

An embodiment of the gauge utilizes its inertia and the friction of the spike moving through the material below the surface 250 to resist the pressure of the blast wave. A plurality of gauges are placed with each gauge's spike being substantially imbedded in the surface 140 extending below the surface into the material below the surface 250. The plurality of gauges are positioned at a number of locations at random distances from the origin of the blast pressure and are placed so that each face 260 is substantially perpendicular to the velocity vector of the blast wave 270 (see FIG. 2C). When the blast pressure impacts the face 260 of the gauge it applies a force over the area of the face 260. This force per area is the blast pressure experienced by the gauge. Upon impact of the blast pressure, the gauge shall tip away from the origin of the blast pressure around an axis located at the bottom rear edge of the gauge 230. This tipping is resisted by the mass of the gauge and the acceleration of gravity (the weight of the gauge), as well as by the opposing forces of friction applied to the spike 220 by the material below the surface 250 soil as the spike moves through the soil. The amount of overturning resistance the gauge shall produce is calculated knowing the moment of inertia of the gauge, the area and shape of the spike 220, and the composition of the material below the surface 250 in which the spike 220 is imbedded, and assuming that the force of the blast pressure is applied uniformly over the face of the gauge. The overturning resistance is equivalent to the threshold blast pressure required to overturn the gauge. When the composition of the material below the surface is difficult to characterize, the threshold blast pressure for a particular configuration of spike gauge is determined by utilizing by a test charge with conventional blast gauges present to measure specific blast pressure at the location of the gauge. Therefore, to detect a particular blast pressure, gauges with the desired threshold blast pressure are selected and placed in random locations around the origin of the blast pressure with the faces placed substantially perpendicularly to the blast pressure. Upon impact by the threshold blast pressure the gauges shall overturn, thereby detecting the blast pressure desired to be detected.

Blast Test to Calibrate Spike Gauges 2,000-pound BLU-117 bomb was detonated in an instrumented arena. The objective of the test was to measure the blast pressure produced by the detonation. The blast pressure was measured by three types of gauges; piezoelectric gauges mounted flush with the ground, piezoelectric gauges mounted 6 feet above the ground, and spike gauges imbedded in the soil with their faces perpendicular to the velocity vector of the blast pressure generated by the detonation.

Figure 4A:
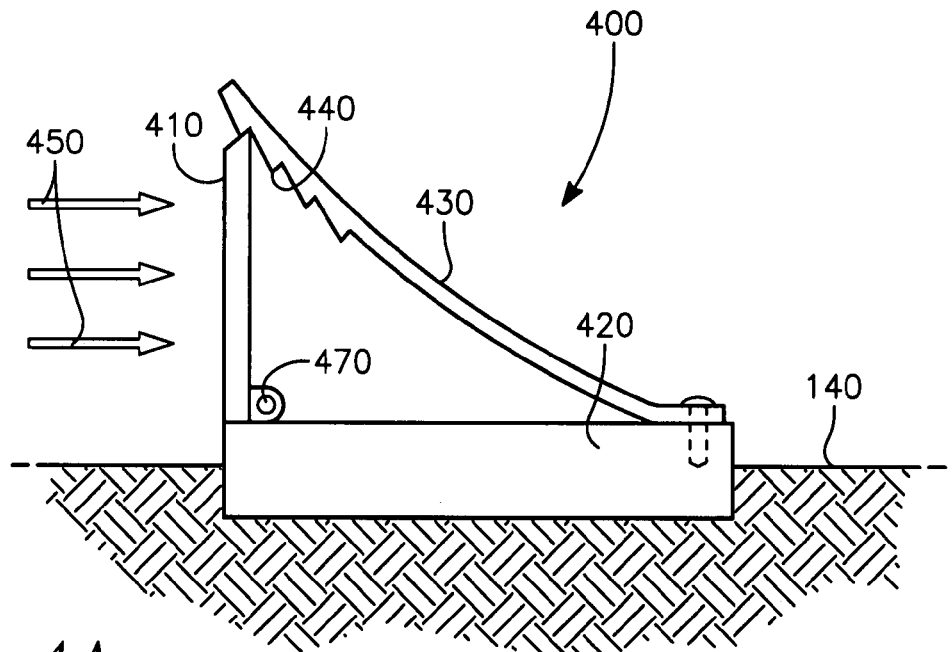
FIGS. 4A-4B are front and side views of a leaf spring gauge according to an embodiment of the invention.
Figure 4B:
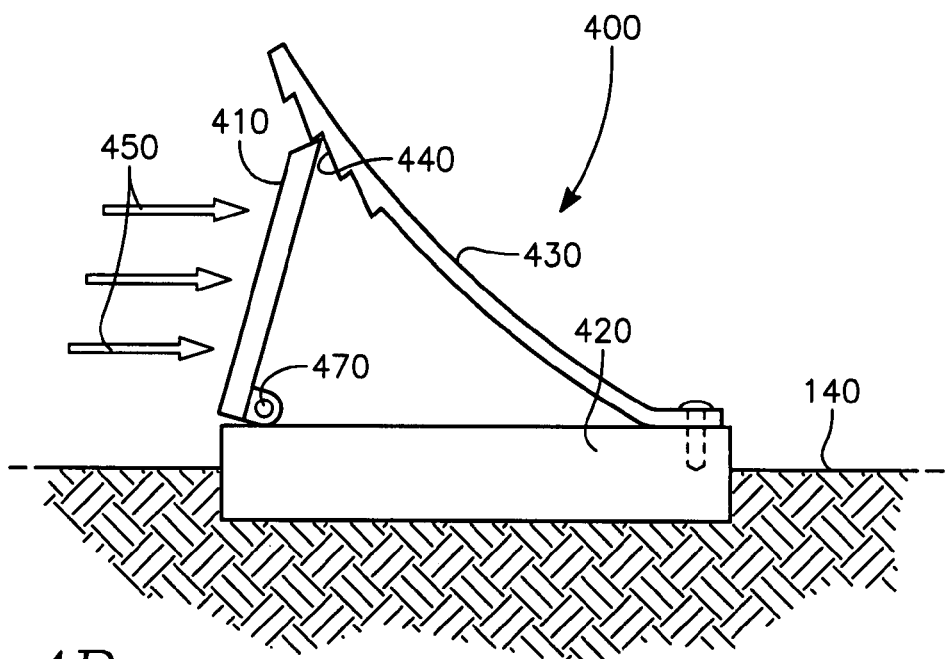

The spike gauges were composed of steel about 0.20 inches thick. After the gauges were driven into the ground, their exposed area was about 15.5 square inches (or 100 square centimeters). The soil at the test site was very firm, resisting the insertion of the spike gauge by hand thereby requiring its insertion by pounding with a hammer. At a distance of 47 feet from the detonation, piezoelectric gauges in the ground recorded peak pressures of 36.39 psi and 41.92 psi for a duration of 9.6 miliseconds. In general, blast pressure durations may be up to about 50 miliseconds. Due to the firm composition of the soil, the blast pressure required to overturn the spike gauge selected was greater than 41.92 psi. Therefore, the threshold pressure of the selected gauge was at least 41.92 psi Leaf Spring Gauge FIGS. 4A-4B illustrate one embodiment of a leaf spring gauge 400. A plate 410 is connected to a base 420 with a hinge. A leaf spring 430 is connected to the base 420. The leaf spring 430 has a means for holding the plate 410 in position, including but not limited to saw-tooth cross section notches 440 in the leaf spring 430 holding the end of the plate 410. A person of skill in the art could provide additional means for holding the plate 410 in position in conjunction with the leaf spring 430. In one embodiment, prior to an impact of a blast pressure, the notches 440 in the leaf spring 430 hold the plate 410 in a position substantially perpendicular to the base 420. The leaf spring 430 rests on the plate 410 and exerts a downward force on the plate 410. The means for holding the plate resists the movement of the plate 410 so that the downward force of the leaf spring 430 on the plate 410 may occur. The specific size and shape of the plate 410, the size and spring constant of the leaf spring 430, and the characterization of the means for holding the plate 410 is dependent upon the threshold blast pressure the gauge is constructed to measure. In the embodiment shown in FIGS. 4A-4B the plate 410 and base 420 are roughly rectangular in shape and of a thickness and weight selected so as to ensure the gauge will remain stationary while being subjected to a blast pressure and resist the blast pressure. The embodiments of the leaf spring gauge may have a weight of up to about 50 pounds and the plate 410 have a surface area of up to about 1 square feet.

A plurality of gauges are placed at a number of random locations, each gauge strategically oriented so that the plates are in positions substantially perpendicular to the velocity vector of the blast pressure 450. The base 420 rests upon the surface 140 or is fully or partially imbedded in the material below the surface. When the blast pressure impacts the plate 410 of the gauge it applies a force over the area of the plate 410. This force per area is the blast pressure experienced by the gauge. Upon impact of the blast pressure, the plate 410 should move away from the origin of the blast pressure around the axis 470. This movement is impeded by the force exerted by the leaf spring 430 on the plate 410. When the blast pressure has ceased the means for holding the plate maintains the position of the plate at a point at which the leaf spring force equally resisted the blast pressure detected. For example, in an embodiment as shown in FIG. 4B, the plate 410 moves and is held in position by a saw-tooth notch 440. When the blast pressure no longer overcomes the resistance of the leaf spring 430 at this point, the movement of the plate 410 stops. The amount of rotational resistance the leaf spring 430 shall produce due to the movement of the plate 410 is calculated knowing the configuration of the leaf spring 430 and its spring constant. The rotational resistance is expressed as force per unit area and is the blast pressure required to move the plate. For example, each saw-tooth notch on the leaf spring 430 corresponds to a specific blast pressure experienced by the plate 430. When each notch 440 is constructed to represent a blast pressure impacting the plate of 2 psi, then a movement of the plate through 3 notches would represent a blast pressure of at least 6 psi. Therefore, to detect a blast pressure, leaf spring gauges 400 may be placed in random locations around the origin of a blast pressure with the plates 410 placed perpendicularly to the blast pressure. Upon impact of the blast pressure the plate 410 will move and stop in a position that corresponds to the blast pressure detected.

It is to be understood that the foregoing detailed description is exemplary and explanatory only and is not to be viewed as being restrictive of embodiments of the invention, as claimed. The invention is capable of other and different embodiments, and its several details are capable of modifications in various obvious respects, all without departing from the invention. Accordingly, the drawings and description are to be regarded as illustrative in nature, and not as restrictive. Thus the scope of this invention should be determined by the appended claims, drawings and their legal equivalents.

What is claimed is:

1. A spike gauge comprising:
   a plate having a spike and a face strategically oriented substantially perpendicular to a blast pressure;
   wherein said plate having said spike extending from and opposing said plate;
   wherein said plate having a weight and said spike having dimensions corresponding to the blast pressure to be detected;
   wherein said plate strategically oriented on a surface, with said spike substantially imbedded in said surface and extending below said surface; and
   wherein said plate tipping away from the origin of said blast pressure upon impact of said blast pressure, wherein said tipping being impeded by said weight of said plate and by opposing forces from said spike, and wherein said plate is overturned when said blast pressure to be detected impacts said face of said plate.

2. The gauge of claim 1 wherein said spike gauge is dimensioned and configured to be portable.

3. The gauge of claim 1 wherein said spike gauge may be constructed of substantially rigid materials.

4. The gauge of claim 1 wherein said spike gauge is hollow to house a liquid or solid.

5. A method for detecting blast pressure, comprising:
   providing a plurality of spike gauges, each said spike gauge comprising a plate having a face and having a spike extending from and opposing said plate, said plate having a weight and said spike having dimensions corresponding to the blast pressure to be detected;
   placing strategically said plurality of spike gauges in a plurality of locations perpendicular to the blast pressure;
   placing strategically said plurality of spike gauges so that each said spike is substantially imbedded in said surface and extending below said surface; and
   tipping of at least one of said plurality of spike gauges away from the origin of said blast pressure upon impact of said blast pressure, said tipping being impeded by said weight of said plate and by opposing forces from said spike, wherein said plate is overturned when said blast pressure to be detected impacts said face of said plate.

6. The method of claim 5 wherein said each of said plurality of spike gauges is dimensioned and configured to be portable.

7. The method of claim 5 wherein said each of said plurality of spike gauges is constructed of substantially rigid materials.

8. The method of claim 5 wherein said each of said plurality of spike gauges is hollow to house a liquid or solid.

9. A blast pressure gauge comprising:
   a plate having a substantially planar face of predetermined area;
   said plate coupled with a spike of predetermined size and shape adapted to penetrate and be removably retained in the ground;
   said spike adapted to position said plate above the surface of the ground when said spike is disposed in the ground;
   said plate adapted to position said substantially planar face in a predetermined orientation relative to the surface of the ground when said spike is disposed in the ground; and,
   the predetermined area of said substantially planar face and the predetermined size and shape of said spike collectively chosen to permit said spike when disposed in the ground to be dislodged when a pressure equal to or greater than a predetermined value is incident upon said substantially planar face.

10. The blast pressure gauge of claim 9 wherein said plate is fabricated of substantially rigid material.

11. The blast pressure gauge of claim 9 wherein said spike is fabricated of substantially rigid material.

12. The blast pressure gauge of claim 9 wherein said plate and said spike are integrally formed.

13. The blast pressure gauge of claim 9 wherein said plate and said spike are removably coupled.

14. The blast pressure gauge of claim 9 wherein said plate and said spike are substantially rigid when a pressure equal to a predetermined value is incident upon said substantially planar face.

15. The blast pressure gauge of claim 9 wherein said plate and said spike do not substantially deform when a pressure equal to a predetermined value is incident upon said substantially planar face.

* * * * *